July 14, 1931.  W. F. HAACK  1,814,690

VEHICLE MAP RACK DEVICE

Filed July 27, 1929  2 Sheets-Sheet 1

INVENTOR
William F. Haack
BY
his ATTORNEYS

July 14, 1931. W. F. HAACK 1,814,690
VEHICLE MAP RACK DEVICE
Filed July 27, 1929 2 Sheets-Sheet 2
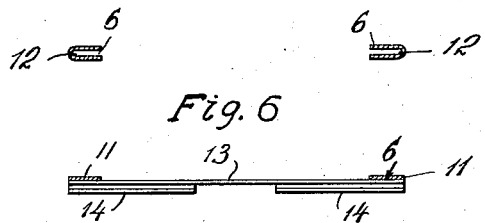
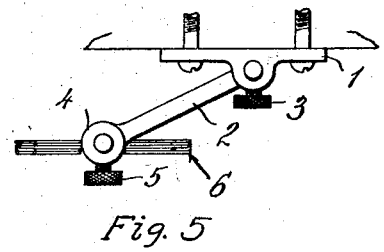
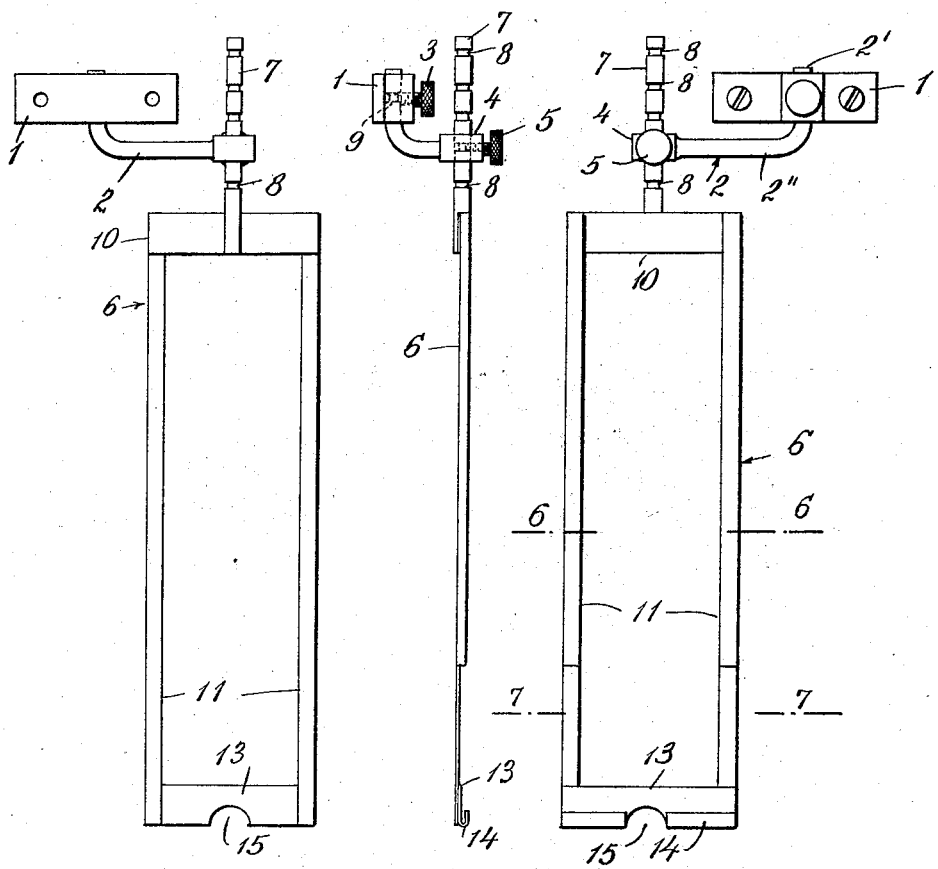
Fig. 6   Fig. 5
Fig. 7
Fig. 4   Fig. 3   Fig. 2
INVENTOR
William F. Haack
BY *his ATTORNEY*

Patented July 14, 1931

1,814,690

UNITED STATES PATENT OFFICE

WILLIAM F. HAACK, OF NEWARK, NEW JERSEY, ASSIGNOR OF ONE-HALF TO ALPHONSO W. RAHN, OF NEW YORK, N. Y.

VEHICLE MAP RACK DEVICE

Application filed July 27, 1929. Serial No. 381,653.

This invention relates to devices for holding and displaying maps and similar sheet articles and retaining them in the desired position while they are being used or handled. It is particularly concerned with a holder for enabling maps and the like to be conveniently used by the driver or pilot of an automobile or aeroplane, and in other vehicles where both the interior room and the lookout-openings are restricted.

It is the chief object of the invention to provide a device whereby a map or the like can be carried in a vehicle, or other restricted compartment, in such a manner that it will be out of the way of the driver and also out of the way of the lookout openings, yet which will nevertheless enable him to use the map while occupied with other things, and whereby without interrupting his driving he can see it plainly and consult it completely without having to take his eyes or attention far enough off the course ahead to make it dangerous.

A particular object of the invention is to provide a map-holder having this improved character which can nevertheless be easily and quickly adjusted in any direction the particular user may require for his better convenience, so as to adapt it to users of different physical characteristics, and which can be readily installed in any kind of vehicle, yet which will be quite simple in construction and easy to manipulate, and cheap to make and sell.

The invention will be more fully and particularly pointed out in conjunction with a description of the construction shown in the accompanying drawings, but the inventive idea is limited in its embodiments only by the scope of the subjoined claims. In these drawings, Fig. 1 is a perspective of the inside of an automobile with the device in place therein;

Fig. 2 is a front elevation of the device by itself;

Fig. 3 is a side elevation thereof;

Fig. 4 is a rear elevation;

Fig. 5 is a top plan of the device;

Fig. 6 is a cross-section on line 6—6 of Fig. 2;

Fig. 7 is a cross-section on line 7—7 of Fig. 2, and

Figure 8:
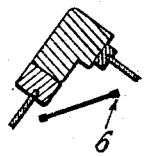
Fig. 8 is a detailed section on line 8—8 of Fig. 1.
Figure 1:
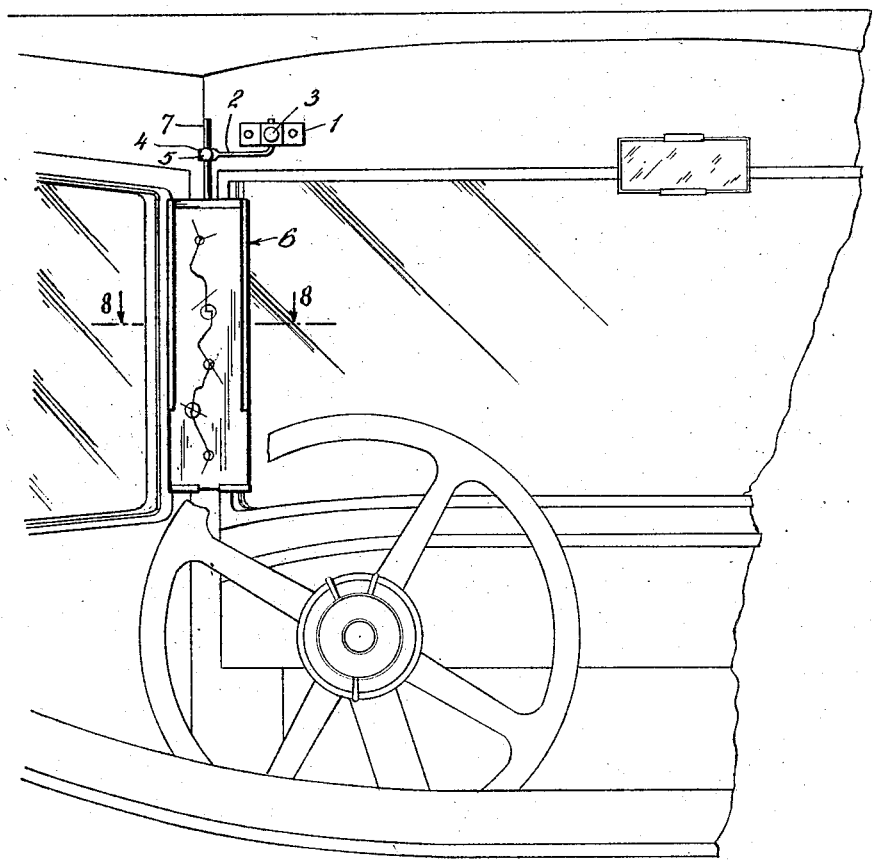

Referring by numerals to the drawings, the device comprises a strap or bracket plate 1 adapted to be suitably attached, as by screws or the like, flat to the wind shield frame of a vehicle, here shown as an automobile, at a certain point on the frame member above the wind shield. The bracket carries a link member 2 having a vertical portion 2' and a horizontal portion 2'', the vertical portion being disengageably and pivotally held in the loop of the bracket by means of a peripheral groove 9 in the link member, which groove is engaged by the point of a thumb set-screw 3. The peripheral groove is adapted to register with the point of the set-screw in such a manner as to allow free horizontal play of the link or arm 2 without permitting any vertical movement thereof, until the screw is fully retracted from the groove. Thus, the normal operation of the arm is a horizontal swinging, without any vertical slip, though the set-screw may be readily manipulated either to permit vertical movement of the arm, or to clamp the arm to prevent either vertical or horizontal movement.

The lengths of the vertical and horizontal portions of the link member are made to vary with the type of vehicle, and for automobiles are such that the bracket can be secured above the wind shield, out of the way, and in such a location that the free end of the link will fall approximately in the plane of the center of the left corner-post angle and above both windows. The link can thus be revolved in a horizontal plane lying above the windows, from the left corner-post around to the right, to lie flat against the wind shield frame in its right-hand position, and can be locked in either position. The link and bracket members are preferably made of simple castings of some inexpensive but durable metal. The free end of the link is enlarged and has a bore such as to form a bearing or collar 4, and this collar is drilled radially and tapped for a thumb set-screw 5, which faces the driver when the link end is in its normal position behind the corner-post.

Suspended from the supporting arm 2 by the collar and thumb screw arrangement is a member 6 having a connection with the arm 2 by means of a member 7. The member 7 consists essentially of a rod of suitable length and material and bearing a plurality of varyingly spaced peripheral grooves 8, of a depth and width sufficient to bear solidly on the point of the set-screw 5 in order to alone form the suspension for the member 6. The point of the set-screw 5 is borne upon by the top side of the groove, and thus the frame is suspended in effect on the point of the set-screw, and can be rotated freely and easily by a slight touch about a vertical axis around a complete horizontal circle without slipping up or down. Tightening the screw fixes and locks the frame in the desired position of horizontal angularity relative to the driver. When the screw is sufficiently retraced, however, the entire member 6 can be adjusted up and down for height, to suit the convenience of the driver, by a gentle push or pull on the bottom and then locking it in the new position. The closeness of the member 6 to the driver can be adjusted readily by a slight pull or push on the member 6 or the supporting arm 2, then locking it in position.

The member 6 consists essentially of an open-face framework having such a structure as to expose both sides of the map when placed in the member, yet so that it will be securely held onto the frame in a vertical position. To this end, the member consists of a top piece 10 running transversely across the lower end of the post member 7, and attached flat to the slabbed off lower end thereof. To one side of the bar 10 are attached a pair of much longer and narrower strips 11, spaced-apart in the manner shown. These strips extend vertically, and are preferably each made of flat thin metal blanked out into a long strip having an ear running down most of one side, the ear then being lapped over inwardly toward the other edge to form an inwardly opening groove or channel 12. These grooves thus extend laterally of the frame face, and they occupy the inner edge of the strips for a distance dependent upon the kind of article to be carried by the framework; that is, if the article is to be short and therefore comparatively rigid, the grooves are made to extend only a short distance down from the top, but if the article is to be long and therefore relatively flexible, the grooves are then extended down closer to the bottom of the framework. Across the front, flat face of the side pieces at the lower end where there are no laps, a bar 13 having an upwardly-opening trough 14 therein on one side is attached transversely and completes the rigid framework structure. The bar 13 is also provided with a notch 15 in the middle of its lower edge, piercing through the bar and trough 14.

The map or other sheet-article is mounted in place by inserting its upper end over the trough 14 up into the side-guides 12 and pushing upwardly until its lower end clears the lap of the trough 14 entirely, when the card or sheet will drop down into the trough. The map can then be grasped and pulled down farther and adjusted in the frame by means of the notch 15, by which means also the map can conversely be pushed up and out of the trough and pulled out of the frame.

Thus the map can at all times be positioned out of the way of the driver and the various instrumentalities in the vehicle, yet it is so located that he can see the outstanding features of the map out of the corner of his eyes without taking his eyes wholly off the road ahead, and withal without the use of the device cutting down any part of the field of vision looking out of the vehicle in any direction. Each side of the map can be seen by merely flicking and rotating the frame around in its suspension to display the other side.

When not in use, the frame may be removed from the device and the automobile by simply loosening the screw 5 slightly and letting the frame drop out of the collar into the hand of the driver, and the arm 2 may then be folded back against the wind shield and locked. The device is particularly well adapted for use during long cross-country trips, as even with a small scale strip map showing the route in great detail and covering only about 50 miles, the map will not have to be changed or taken out and replaced often, or more than once a day, due to the various adjustment features already described.

Various mechanical refinements and substitutions, and modifications in the form and arrangements of the parts, of the frame as well as of its connections to the vehicle, may obviously be made without changing the inventive idea of the device.

I claim:

1. A map-rack device for vehicles, including a supporting member having one end pivoted to the vehicle and having the other end a sufficient horizontal distance from the pivot to lie behind a corner post of the vehicle, and a map-retaining member supported by the corner-post end of said supporting member.

2. A map-rack device for vehicles, including a supporting member having one end pivoted above the wind shield of the vehicle and a double face map-gripping member rotatably mounted in the other end of said supporting arm so as to expose alternately each side of the map in the same location in the vehicle.

3. A map-rack device for vehicles, including a supporting member having one end pivoted to the vehicle and a map-retaining member supported from the other end of said supporting member and adjustable vertically therethrough and rotatable through a complete horizontal circle about the axis thereof which passes through the support.

4. In a map-rack device for vehicles, a map holding member and means for connecting said member to the vehicle, comprising a bracket over the windshield, an arm disengageably pivoted therein by one end for swinging in a horizontal plane, and a post member projecting upwardly from said map-holding member and disengageably mounted and adjustable vertically and rotatably in the other end of said supporting arm.

5. A map-rack device for vehicles including a map-holding member supported by a member pivoted to the vehicle and pivoted to the map-holding member, the map-holding member being double-faced and comprising an open framework having sheet-retaining members on one face around three sides of the opening.

In testimony whereof I affix my signature.

WILLIAM F. HAACK.